United States Patent [19]

O'Brien et al.

[11] Patent Number: 5,230,252
[45] Date of Patent: Jul. 27, 1993

[54] FORCE TRANSDUCER

[75] Inventors: Michael J. O'Brien; William B. Smith, both of Rochester, N.Y.

[73] Assignee: Eastman Kodak Company, Rochester, N.Y.

[21] Appl. No.: 767,749

[22] Filed: Sep. 30, 1991

[51] Int. Cl.$^5$ ............................................. G01L 1/22
[52] U.S. Cl. ................................ 73/862.637; 177/211
[58] Field of Search ........... 73/862.64, 862.65, 862.66, 73/862.67; 177/211

[56] References Cited

U.S. PATENT DOCUMENTS

| | | | |
|---|---|---|---|
| 3,110,175 | 11/1963 | Seed | 73/862.65 |
| 3,513,431 | 5/1970 | Kovacs . | |
| 3,589,180 | 6/1971 | Kovacs . | |
| 3,771,359 | 11/1973 | Shoberg . | |
| 3,958,456 | 5/1976 | Jacobson . | |
| 3,969,935 | 7/1976 | Shoberg . | |
| 4,009,608 | 3/1977 | Ormond . | |
| 4,162,628 | 7/1979 | Oetjen et al. . | |
| 4,423,793 | 1/1984 | Caris . | |
| 4,463,614 | 8/1984 | Lee | 73/862.64 |
| 4,546,838 | 10/1985 | Ormond . | |
| 4,576,053 | 3/1986 | Hatamura . | |
| 4,657,097 | 4/1987 | Griffen . | |

FOREIGN PATENT DOCUMENTS

0107373 8/1979 Japan .
1456403 11/1976 United Kingdom .

Primary Examiner—Reinhard J. Eisenzopf
Assistant Examiner—E. Shopbell
Attorney, Agent, or Firm—Mark Z. Dudley

[57] ABSTRACT

A load cell incorporates two identical sensing beams equipped with resistance-type strain gauges. The beam geometry is such that a large constant shear strain is developed at the strain gauge locations. Two different strain gauge arrangements are used to provide linear response to axially applied forces while rendering the transducer insensitive to extraneous forces and couples. The geometry allows a fully redundant set of gauges to be placed on the beams for high reliability applications. Bridge balance and temperature compensation are accomplished by optimizing the direct deposited thin film gauge material which are then laser trimmed.

13 Claims, 8 Drawing Sheets

FORCE TRANSDUCER

BACKGROUND OF THE INVENTION

1. Technical Field

The present invention relates to load cells or force transducers having multiple shear areas within the body for strain measurement, and more particularly to such load cells that have full redundant high precision axial sensitivity with insensitivity to extraneous forces and couples.

2. Background Art

Force transducers used to measure axial loads are found in nearly all actively controlled mechanical systems. A particularly stringent application is that of measuring an applied force in order to control the shape of a deformable optic. Such applications require high accuracy, long-term stability, and full redundancy of the actual sensing elements since the force actuator which employs the force transducer will be in aerospace devices. Another key requirement is the ability to sense axial forces only while remaining insensitive to other extraneous applied forces. A variety of methods both mechanical and electrical have been devised to compensate for limitations in these aspects of load cell performance.

A simple shear mode axial force transducer, U.S. Pat. No. 3,513,431 to Kovacs, uses multiple gauges placed circumferentially about the transducer body to partially compensate for nonaxial loading. U.S. Pat. No. 4,162,628 to Oetjen et al, has increased stiffness and employs larger shear panels arranged symmetrically around the transducer body. Both designs are multiple gauges in each bridge leg to compensate for side loading. U.S. Pat. No. 3,969,935 to Shoberg, employs a unitary transducer body using a stress concentration to increase axial strains while reducing the effects of off-axis forces. A combination of this approach and circumferentially locating gauges is shown in U.S. Pat. No. 4,423,793 to Caris.

None of the above designs fully compensates for moments applied about the measuring axis. U.S. Pat. No. 3,958,456 to Jacobson employs multiple gauges on multiple surfaces to electrically subtract effects of applied moments and forces. Gauges can also be configured such that forces applied to all three axes can be determined such as in U.S. Pat. No. 3,771,359 to Shoberg. These are complicated, expensive and difficult to balance and calibrate. Another method of reducing sensitivity to extraneous force is to isolate the measuring beam from all but the desired axial load. This was illustrated in U.S. Pat. Nos. 4,009,608 and 4,546,838 to Ormond by using parallel beam flexures to isolate the shear panel from extraneous loads. The use of special strain gauge design and critical placement to compensate for offset loads is disclosed in U.S. Pat. No. 4,657,097 to Griffen. Moment compensation for a single axis shear sensor is illustrated in British Patent No. 1,456,40 to Hindle.

SUMMARY OF THE INVENTION

The present invention uses a sensing beam and strain gauge configuration that allows insensitivity to all extraneous loads. It has the capability of sensing tensile or compressive loads along the transducer axis. Direct deposited strain gauges are employed in conjunction with selected insulating and protective layers to provide temperature, creep, and span compensation. This physical construction allows an actuating mechanism to be located inside the transducer.

The transducer employs a pair of instrumented flexures loaded in shear. Physical placement of the gauges affords insensitivity to all loading except that along the transducer axis. Electronics include an instrumentation amplifier to sense bridge output. Gain and offset are included before the final low pass filter and output stage.

DESCRIPTION OF THE PREFERRED EMBODIMENT

Figure 1:
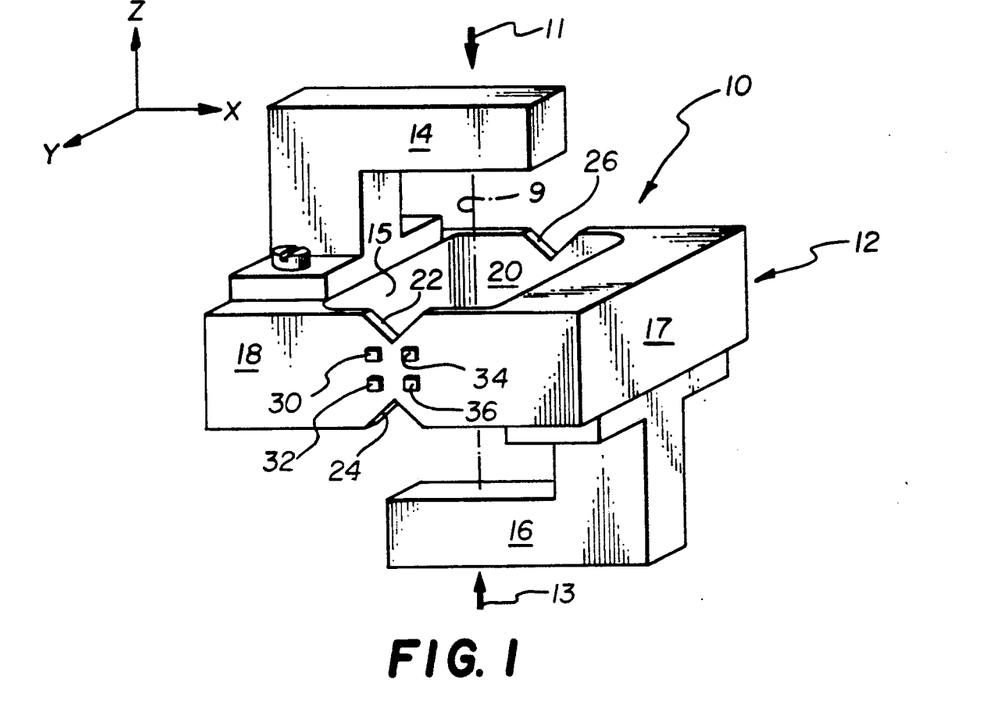
FIG. 1 is a full perspective view of the force transducer illustrating an applied compressive load.
Figure 2A:
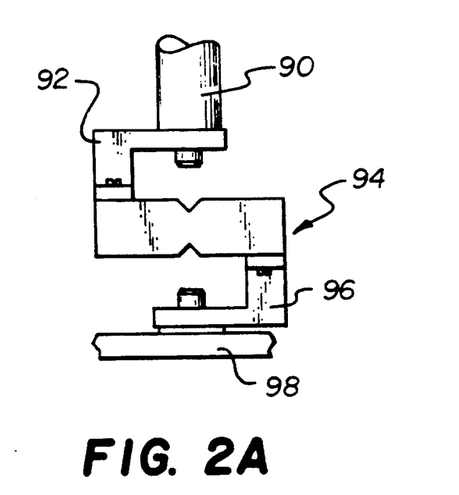
FIGS. 2A and 2B show a side view and an endview respectively of an embodiment of a transducer using a single sensing beam.
Figure 2B:
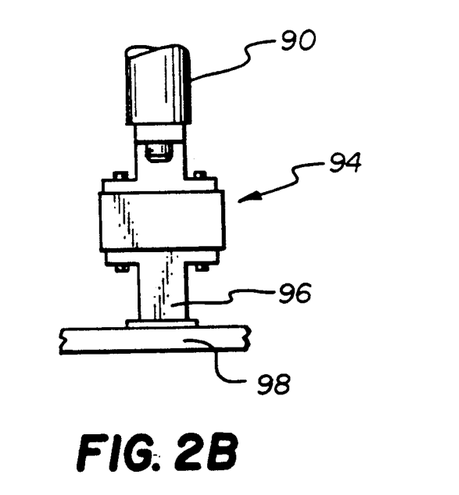

FIG. 1 shows a first and preferred embodiment of the transducer. The transducer assembly 10 comprises a sensor body 12 that is symmetrical about an axis of rotation 9 and has a pair of loading arms 14 and 16. A force shown as arrows 11 and 13 which are directed along the axis of rotation and is shown as compressive in FIG. 1, causes a force and moment about the Y axis to be transmitted to the sensing beam mounts 16 and 17. A pair of sensing beams 18 and 20 having opposed notches 22, 24, and 26, 28 located at the upper and lower sides of the sensing beams, respectively with the upper and lower notches located about a central axis aligned with a bisecting line of each sensing arm so as to produce a constant strain in the center of the beam which is proportional to the applied load. Because the resulting strain is constant over a fairly large area near the center of the beam, a set of four thin film electrical resistance strain gauges 30, 32, 34, and 36 are placed in this area. A similar set is placed on the outboard side of the second beam (not shown in FIG. 1) giving a total of eight strain gauges in the transducer.

Figure 4:
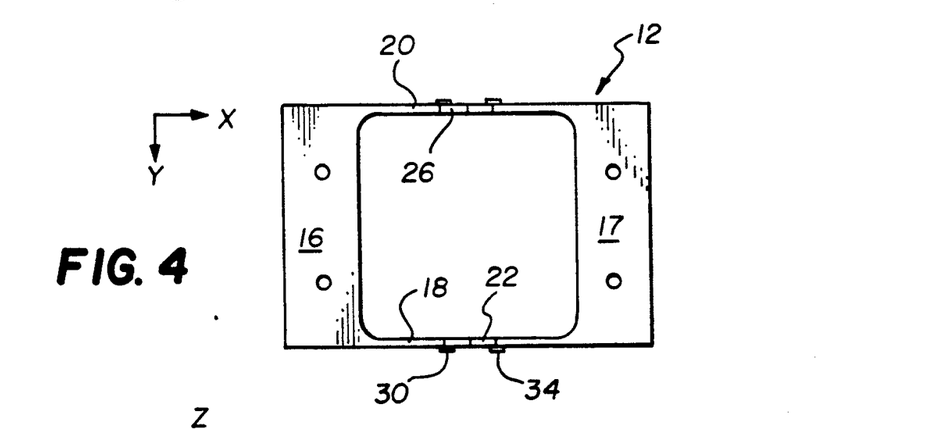
FIG. 4 is a top view showing the integral construction of the sensing beams and sensing beam mounts.
Figure 5:
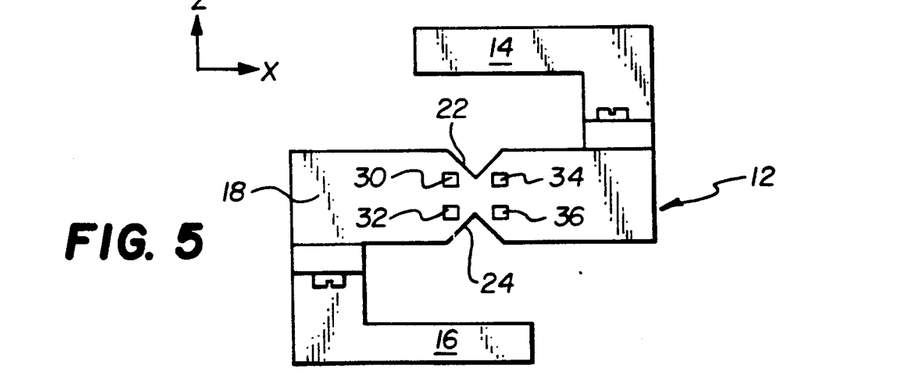
FIG. 5 illustrates the side view of the first embodiment shown in FIG. 1 and FIG. 4, but showing use of machine screws to attached the loading arms to the sensing beam mounts.

FIG. 4 shows a top view of a one piece sensor body 12 comprising sensing beams 18 and 20 and sensing beam mounts 16 and 17. A side view of the transducer with loading arms 14 and 15 one of preferred embodiment is shown in FIG. 5. The sensor body 12 is machined from a single piece of AM335 stainless steel measuring approximately $1.3 \times 2.3 \times 0.6$ inches making the sensing beams 18 and 20 and the beam mounts 16 and 17 integral parts. Loading arms 14 and 15 in FIGS. 1 and 5 are made of the same material but may be made of aluminum or any other material. Sensing beam 18 has notches 22 and 24 which are machined into the center of the sensing beam 18. The point of load application is maintained along the Z axis by the loading arm 14 and 15 geometry. Electrical resistance strain gauges 30, 32, 34, and 36 are attached to the outboard surface of sensing beam 18. Although thin film deposited gauges of Nichrome to match the body material's coefficient of thermal expansion are preferred, standard bondable foil or semiconductor gauges may also be used.

Figure 6:
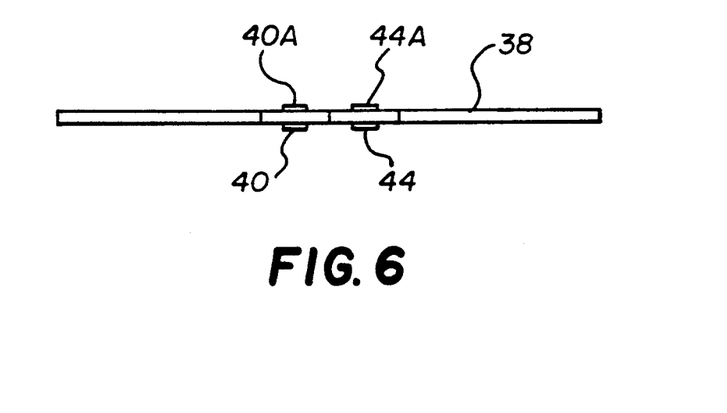
FIG. 6 shows a top view of a sensing beam with the placement of the sensors.
Figure 7:
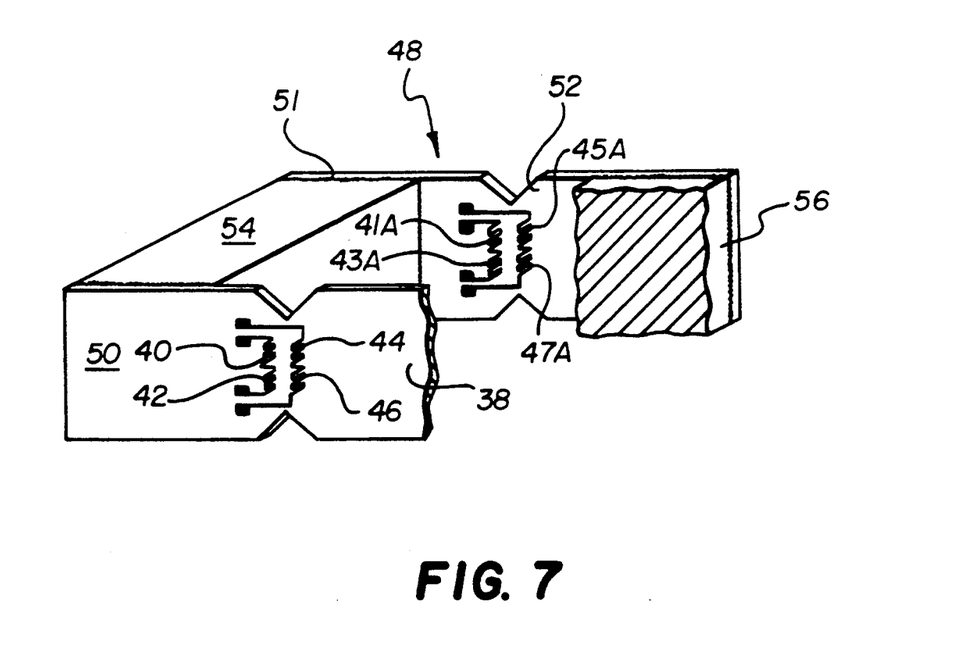
FIG. 7 illustrates a second embodiment where the sensing beam mounts are separate parts with the sensing beam and sensing beam mounts partially cutaway to show the use of inboard sensors on the sensing beams.
Figure 8:
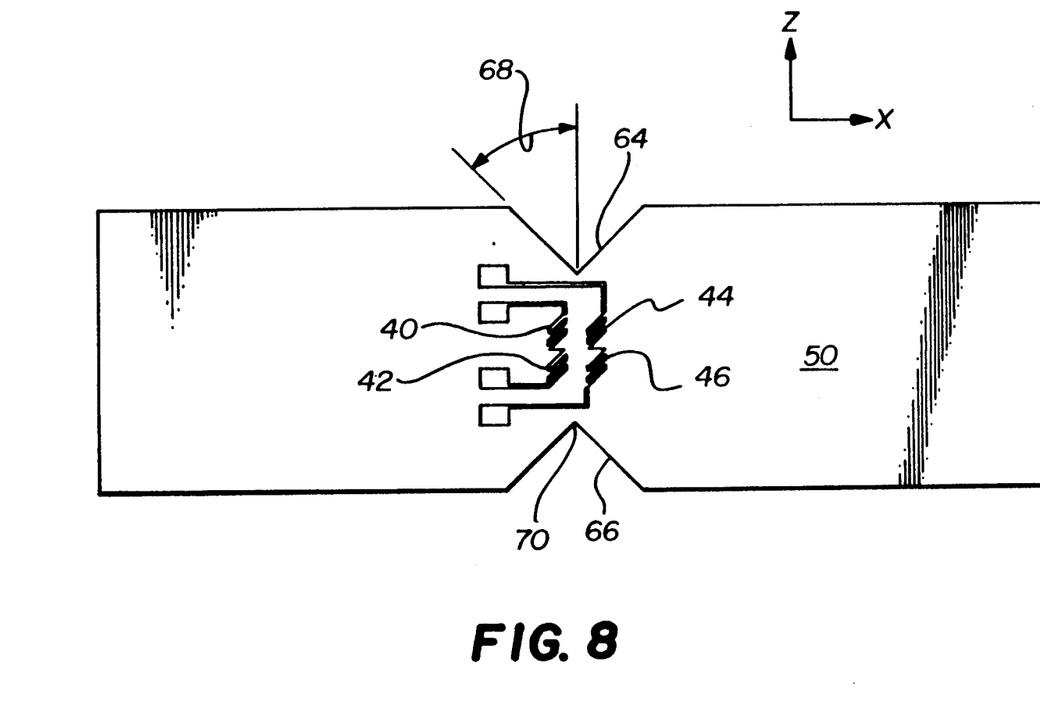
FIG. 8 is a detailed view of a sensing beam showing the sensor configuration in detail.

A second embodiment is shown in FIGS. 6, 7 and 8. A top view of a single sensing beam is illustrated in FIG. 6. Two sets of four strain gauges, 40, 42, 44, 46 and 40A, 42A, 44A, 46A are employed on a single sensing beam 38. The first set is on the outboard side of sensing arm 50, and a second set 41, 43, 45, 47 is shown on the outboard side of sensing beam 52. The second or mirror image set is designated by the letter "A" on the inboard side of the sensing beams 50 and 52, which are applied as mirror images of one another on opposite sides of sensing beams 50 and 52. The redundant set of strain gauges is used as a backup sensing element in high reliability applications. FIG. 7 is a partial cutaway view of a four piece sensor body 48. Two sensing beams 50 and 52 are attached to the beam mounts 54 and 56 by electron beam welds 51 after strain gauges 40, 42, 44 and 46 have been placed on the outboard sides of sensing beam 50 and strain gauges 40A, 42A, 44A, 46A are placed on the inboard side of sensing beam 50 such as in FIG. 7. Loading arms may be welded or attached by standard fasteners as shown in FIG. 5 to the beam mounts 54 and 56 as in the previously discussed embodiment.

A sensing beam 50 designed to measure up to a five pound load (10 pounds per the complete transducer) is shown in FIG. 8. Notches 64 and 66 dimensions have been selected so that the notch angle 68 and tip radius 70 produce a uniform shear strain, in the central portion of the sensing beam 50. The depth of the notches 64 and 66 determines the overall strain level for a given beam material and thickness. This design produces a peak strain of approximately 300 micro inches per inch at full load. In general, the notch depth should be at least 20% of the total beam width to confine the constant strain area to the center of the beam. Notch angle 68 is not critical but should be 40° to 60° to avoid edge effects near the sensing area. Tip radius 70 is chosen to produce a uniform shear strain over the sensing area where strain gauges 40, 42, 44 and 46 are placed. Reducing the radius will increase the shear area but reduce uniformity. Increasing the radius produces a smaller but more uniform strain area. Finite element analysis is used to optimize the radius, notch angle, and depth to maximize the strain area and uniformity.

Strain gauges 40, 42, 44 and 46 must be oriented symmetrically about center lines of sensing beam 50 in the X and Z directions to compensate for extraneous loads.

Because the strain is pure shear, the maximum and minimum principle strains are perpendicular to each other.

Compressive and tensile strains can be easily measured by orienting the strain gauges at right angles to each other.

Figure 3A:
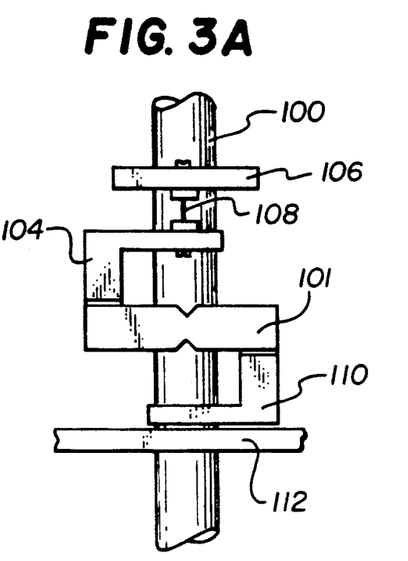
FIGS. 3A-3B is a side view and an end view respectively of another embodiment of the transducer body using a pair of sensing beams and a pair of loading arms.
Figure 3B:
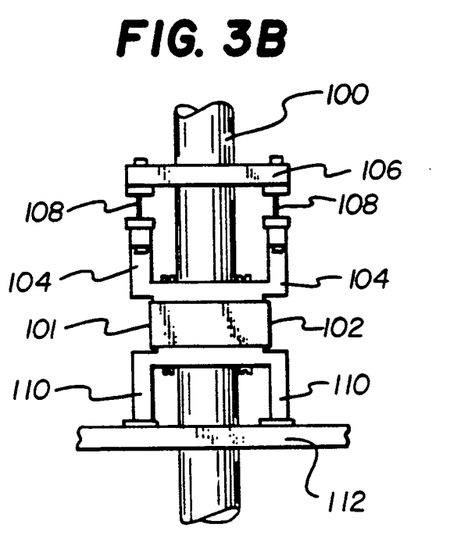

Two loading arm configurations are illustrated in FIGS. 2A-B and 3A-B. A side view of a single cantilever design is presented in FIG. 2A with an end view there of in FIG. 2B. The force is applied through strut 90 attached to loading arm 92, transmitting the load to the sensor body 94. Loading arm 96 mounts on a baseplate 98 to provide the reaction force and moment. This arrangement may be used in any application where an in-line device is needed to measure tensile and compressive axial forces. A split loading arm configuration is illustrated in FIGS. 3A and 3B. The loading strut 100 passes between the sensor beams 101 and 102 and attaches to loading arm 104 through collar 106 attached to the strut 100 via rod flexures 108. A reaction force and moment are provided by loading arm 110 mounted to a mechanical base 112. The method of attachment of the strut to the loading arms is not critical because this embodiment is essentially insensitive to extraneous forces and moments.

Figure 9:
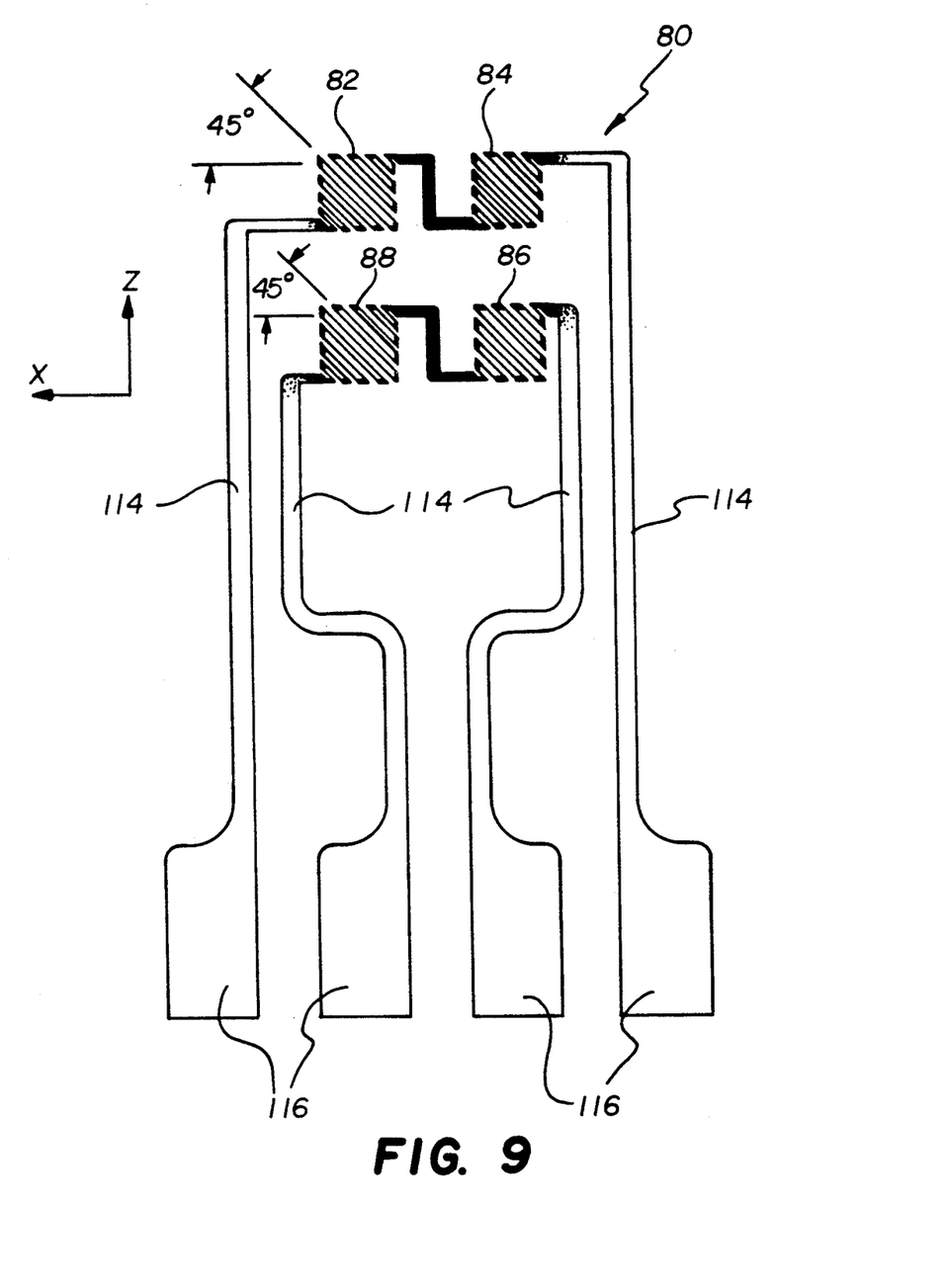
FIG. 9 illustrates the strain gauge pattern used in a constant current sourced half active bridge.

A strain gauge configuration designed for constant current bridge excitation is shown in FIG. 9. The pattern 80 consists of four fine wire gauge patterns 82, 84, 86, 88 all of which have their wires oriented 45° to the X axis. Their position within the strain field measures the maximum or minimum principle strain, depending on the direction of the applied force. This creates an increase or decrease in resistance proportional to the applied load in all strain gauges. The orientation is not critical, however all gauges must be at the same angle. A 45° angle maximizes the transducer sensitivity and linearity by orienting the gauges along the principle axis. Electrical connections to external circuitry are made through wide connecting runs 114 to solder pads 116.

Figure 10:
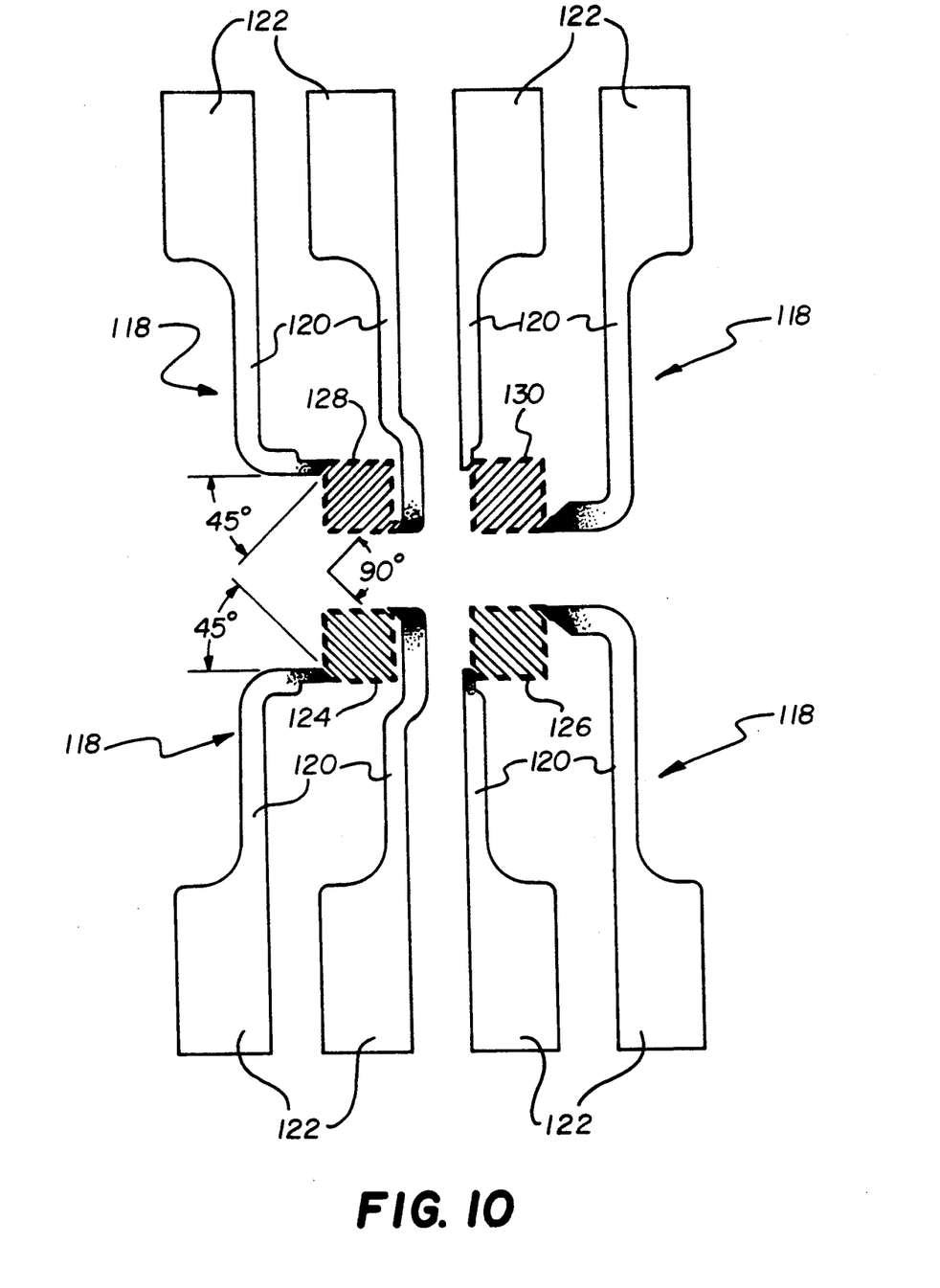
FIG. 10 illustrates the strain gauge pattern used in a constant voltage excitation fully active bridge.

A strain gauge pattern 118 is shown in FIG. 10 for fully active constant voltage bridge excitation. In this case, the connecting runs 120 terminate each gauge in a solder pad 122. The gauges 124 and 126 are oriented at 45° to the X axis while gauges 128 and 130 are oriented at 90° to gauges 124 and 126. The gauges are oriented in pairs along the principle axes within the constant shear strain area. Gauges 124 and 126 will decrease resistance while gauges 128 and 130 will increase resistance when a tensile load is applied. Gauge resistance changes are reversed when a compressive load is applied. The orientation is not critical, however, gauges 124 and 126 must be at the same angle while gauges 128 and 130 must be perpendicular to gauges 124 and 126. The present angles are chosen to maximize transducer sensitivity and linearity by orienting the gauges in the major and minor principle directions. Connecting runs 120 are approximately 200 microns wide terminating in pads 122 that are approximately $540 \times 2300$ microns. The overall pattern 34 length is not critical and is from 15 mm to 18 mm.

Figure 11:
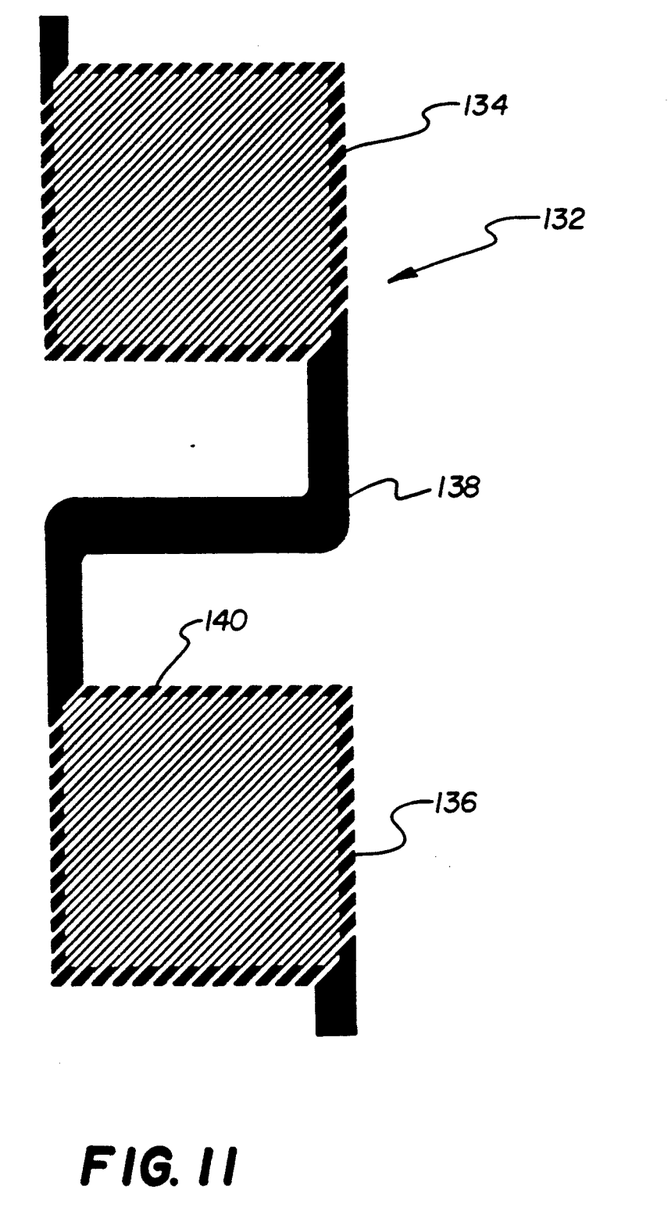
FIG. 11 is a detailed view of a constant current configuration strain gauge.

Gauges are made of sputtered 2 micron thick Nichrome V alloy (80% Ni, 10% Cr also referred to as Nichrothal 8 or Chromal 8) deposited over a 1.5 micron thick insulated layer of silicon dioxide evaporated onto the sensing beam surface. The pattern 132 in FIG. 11 results in a total resistance of approximately 4 kilohms per gauge. Other alloys such as Nichrothal 6 (61% Ni, 23% Fe, 15% Cr) or Karma (73% Ni, 20% Cr, 7% Al+Fe) may also be used. Nichrome V was chosen for its coefficient of thermal expansion which matches that of the insulating layer and sensing beam material. After etching or ion beam milling the strain gauge patterns from the Nichrome V layer, a 1 micron thick protective layered of silicon dioxide is deposited over the strain gauge and connecting runs. The active gauge areas 134 and 136 consist of 2 micron lines with 10 micron spacing. Connecting sections 138 are 100 microns wide while section 140 is 130 microns wide. These dimensions are optimized to cancel the effects of straining these connecting runs.

Figure 12A:
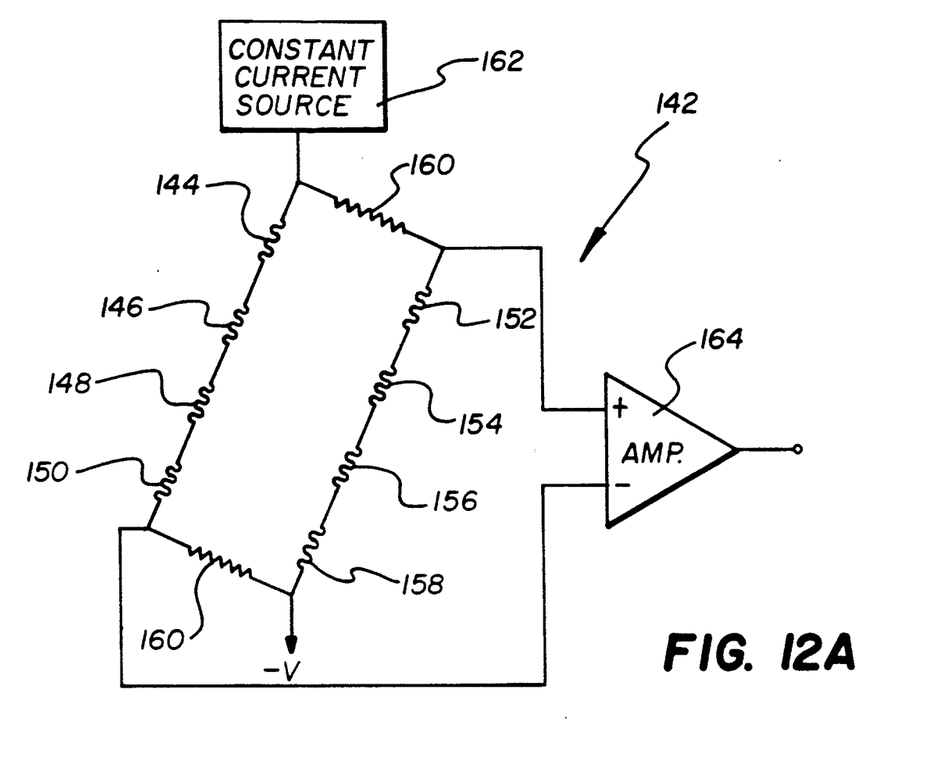
FIGS. 12A-12B are schematic diagrams of the strain gauge bridge and electronics for constant current and constant voltage bridge excitation respectively.

A bridge configuration, shown generally as 48 designed for use with the strain gauge configuration 118 shown in FIG. 9 is presented in FIG. 12A. Strain gauges 144, 146, 148, 150 all increase or decrease resistance with the applied load. Gauges 152, 154, 156, 158 also change in the same direction as 144, 146, 148 and 150. The bridge is balanced using precision resistors 160 such as Vishey Type S102C which are available in temperature coefficients equal to the gauge material. Bridge excitation is derived from a constant current source 162 such as Burr-Brown REF-200 or a conventional op amp/FET source. The bridge is returned to the negative power supply to keep the bridge output near zero, preserving the full dynamic range of the electronics. A standard precision instrumentation amplifier 164 such as the Analog Devices AD-624. This configuration provides a linear output directly proportional to the applied force, and compensates for extraneous loads by proper grouping of the gauges in each bridge leg.

Figure 12B:
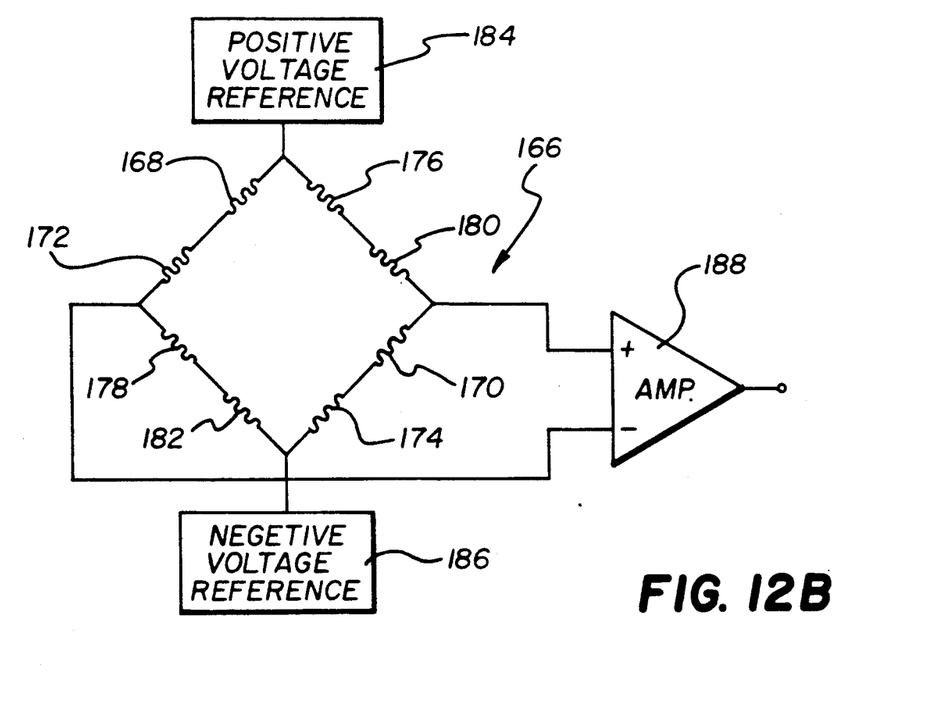

A bridge configuration 166 designed for use with strain gauge configuration 34 shown in FIG. 10 is illustrated in FIG. 12B. Gauges 168, 170, 172, 174 increase or decrease resistance when a force is applied to the transducer. Gauges 176, 178, 180, 182 all change resistance together but opposite to gauges 160, 170, 172, 174. The existence of pure shear strain in the sensing beam allows equal but opposite strains to be sensed by orienting the gauges 160, 170, 172, 174 wires perpendicular to gauges 176, 178, 180, 182 wires. The gauges are placed in the bridge such that extraneous forces create strains that do not affect bridge balance.

Bridge excitation is provided by a positive voltage reference 184 and negative voltage reference 186 such as the Analog Devices AD-2702 Precision reference. The bipolar excitation keeps the bridge quiescent output near zero, preserving the full dynamic range of the electronics. The bridge output signal is amplified by a precision instrumentation amplifier 188 as in the previous arrangement.

ADVANTAGES AND INDUSTRIAL APPLICABILITY

The present invention has the advantage that the force transducer has a dual beam construction allowing it to accommodate mechanical assemblies along the axis of the applied force and its simple geometry eases manufacture. In addition, the large constant strain area makes mounting of gauges less critical than standard bending mode transducers and the strain gauge placement makes the transducers insensitive to extraneous forces and moments.

What is claimed is:

1. An electromechanical measuring transducer for converting a linear force to be measured into a shear force measurement by shear gauges, comprising:
   a transducer body including a pair of sensing beam mounts, each mount connected to an end of a pair of sensing beams;
   a pair of loading arms each attached to a sensing beam mount;
   each sensing beam further including a pair of opposed notches symmetrically located about a central axis located midway between the ends of the sensing beams; and
   four strain gauges symmetrically located about the central axis of the notches on each sensing beam.

2. A transducer as claimed in claim 1 wherein four strain gauges are located on opposite sides of the sensing beam symmetrically located about the central axis of the notches.

3. A transducer as claimed in claim 1 wherein said sensing beam mounts and said sensing beams are integral so as to form said transducer body.

4. A transducer as claimed in claim 1 wherein said sensing beam mounts are electron welded to said sensing beams to form said transducer body.

5. A transducer as claimed in claim 1 wherein said loading arms are attached to said sensing beam mounts by machine screws.

6. A transducer as claimed in claim 1 wherein said loading arms are attached to said sensing beam mounts by electron welding.

7. A transducer as claimed in claim 1 wherein said loading arms are in the form of a split bifurcated arm.

8. A transducer as claimed in claim 1 wherein said strain gauges are made of sputtered 2 micron thick nichrome V alloy deposited over a 1.5 micro thick insulated layer of silicon dioxide evaporated on the surface of the sensing beam.

9. An electromechanical measuring transducer for converting a linear force to be measured into a shear force for measurement by shear gauges comprising:
   a transducer body having an axis of rotation along which the forces to be measured are applied;
   said transducer body having a pair of sensing beams separated by a pair of beam mounts one at each end of said sensing beams;
   upper and lower load arms second ends, said first end of each arm being connected to a respective beam mount and said second end adapted to receive the force to be applied along said axis of rotation;
   said sensing beams having opposed upper and lower notches each located and aligned along the lateral bisector of each sensing beam;
   two pairs of strain gauges located on at least one side of each sensing beam with one pair of gauges on each side of the lateral bisector between said upper and lower notches.

10. A force transducer as set forth in claim 9 wherein the depth of the notches are at least 20% of the total beam width.

11. A force transducer as set forth in claim 9 wherein the angle of the notches are within a range of 40° to 60°.

12. A force transducer as set forth in claim 11 wherein the strain gauges contain a serpentine wire configuration oriented at 45° to the upper and lower edges of the sensing beams.

13. A force transducer as set forth in claim 11 wherein the strain gauges contain a serpentine wire pattern and the wire patterns of two of the gauges are oriented 90° with respect to the wire patterns in the remaining gauges on said sensing beam.

* * * * *